US009706460B2

(12) United States Patent
Iwanaga

(10) Patent No.: US 9,706,460 B2
(45) Date of Patent: Jul. 11, 2017

(54) WIRELESS COMMUNICATION TERMINAL AND ROAMING METHOD FOR WIRELESS COMMUNICATION TERMINAL

(71) Applicant: NEC Platforms, Ltd., Takatsu-ku, Kawasaki-shi, Kanagawa (JP)

(72) Inventor: Yuji Iwanaga, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 0 days.

(21) Appl. No.: 14/787,300

(22) PCT Filed: May 28, 2014

(86) PCT No.: PCT/JP2014/064081
§ 371 (c)(1),
(2) Date: Oct. 27, 2015

(87) PCT Pub. No.: WO2014/192796
PCT Pub. Date: Dec. 4, 2014

(65) Prior Publication Data
US 2016/0073309 A1 Mar. 10, 2016

(30) Foreign Application Priority Data

May 29, 2013 (JP) ................................ 2013-112805

(51) Int. Cl.
*H04W 36/08* (2009.01)
*H04W 48/16* (2009.01)
(Continued)

(52) U.S. Cl.
CPC ........... *H04W 36/08* (2013.01); *H04W 48/14* (2013.01); *H04W 48/16* (2013.01); *H04W 84/12* (2013.01)

(58) Field of Classification Search
None
See application file for complete search history.

(56) References Cited

U.S. PATENT DOCUMENTS 5,787,349 A 7/1998 Taketsugu
7,599,693 B2 10/2009 Kuriyama
(Continued)

FOREIGN PATENT DOCUMENTS

CN 1399431 A 2/2003
CN 1756435 A 4/2006
(Continued)

OTHER PUBLICATIONS

Malaysian Office Action for MY Application No. PI 2015703924 mailed on May 13, 2016.
(Continued)

*Primary Examiner* — Kodzovi Acolatse

(57) ABSTRACT

A wireless communication terminal includes: a scanning section configured to, in a case where a roaming is performed to switch a connection to an access point in the course of the movement, perform a scan for an access point from a high-priority scan-band in descending order; and a roaming executing section configured to, in a case where a scanning result of the scanning section indicates that an access point of a roaming destination is present, make a connection. In a case where a scanning result of scanning a scan-band of a priority order indicates that an access point of a roaming destination is not present, the scanning section scans a scan-band of a lower priority order than the priority order.

6 Claims, 7 Drawing Sheets

(51) Int. Cl.
*H04W 48/14* (2009.01)
*H04W 84/12* (2009.01)

(56) References Cited

U.S. PATENT DOCUMENTS

| | | | |
|---|---|---|---|
| 2002/0105926 A1 | 8/2002 | Famolari et al. | |
| 2006/0068782 A1 | 3/2006 | Kuriyama | |
| 2006/0223491 A1* | 10/2006 | Freeburg | H04W 48/04 455/404.1 |
| 2006/0234705 A1* | 10/2006 | Oommen | H04L 12/66 455/435.3 |
| 2009/0143095 A1* | 6/2009 | Zhang | H04B 1/005 455/552.1 |
| 2011/0216692 A1* | 9/2011 | Lundsgaard | H04W 48/20 370/328 |
| 2014/0090003 A1* | 3/2014 | Eguchi | H04L 65/4076 725/116 |

FOREIGN PATENT DOCUMENTS

| | | | | |
|---|---|---|---|---|
| CN | 101448291 A | | 6/2009 | |
| EP | 1353521 A1 | | 4/2002 | |
| JP | 2003-264565 A | | 9/2003 | |
| JP | 2007-527187 A | | 9/2007 | |
| JP | 2008-17340 A | | 1/2008 | |
| JP | 2010-21765 A | | 1/2010 | |
| JP | 2012-23694 A | | 2/2012 | |
| JP | 2012-60443 A | | 3/2012 | |
| JP | WO 2012/153581 | * | 11/2012 | H04L 29/08 |
| WO | 01/15481 A1 | | 3/2001 | |

OTHER PUBLICATIONS

Chinese Office Action for CN Application No. 201480024405.7 dated on Aug. 18, 2016 with English Translation.
International Search Report for PCT Application No. PCT/JP2014/064081, mailed on Sep. 2, 2014.

* cited by examiner

FIG.7

| n-th PRIORITY BAND / PATTERN | FIRST PRIORITY BAND | SECOND PRIORITY BAND | THIRD PRIORITY BAND | FOURTH PRIORITY BAND | EXPLANATION |
|---|---|---|---|---|---|
| PATTERN 1 | 802.11b/g | 802.11a (W52/W53/W56) | (NONE) | (NONE) | 802.11b/g TAKES PRIORITY |
| PATTERN 2 | 802.11a (W52/W53/W56) | 802.11b/g | (NONE) | (NONE) | 802.11a TAKES PRIORITY |
| PATTERN 3 | 802.11a (W52) | 802.11b/g | 802.11a (W53) | 802.11a (W56) | 802.11a (W52) AND 802.11b/g TAKE PRIORITY IN ORDER TO PREVENT EMISSION OF RADIO WAVES FROM BEING HALTED DUE TO DETECTION BY WEATHER RADAR. |

WIRELESS COMMUNICATION TERMINAL AND ROAMING METHOD FOR WIRELESS COMMUNICATION TERMINAL

This application is a National Stage Entry of PCT/JP2014/064081 filed on May 28, 2014, which claims priority from Japanese Patent Application 2013-112805 filed on May 29, 2013, the contents of all of which are incorporated herein by reference, in their entirety.

TECHNICAL FIELD

The present invention relates to wireless communication terminals and roaming methods for such wireless communication terminals. More specifically, the present invention relates to a wireless communication terminal that sequentially scans a plurality of scan-bands, and a roaming method for the wireless communication terminal.

BACKGROUND ART

The specification described in IEEE 802.11 classifies bands used for wireless LANs into IEEE802.11b/g (2.4 GHz band) and IEEE802.11a (5 GHz band); hereinafter, IEEE802.11b/g will be abbreviated as 802.11 b/g and IEEE802.11a as 802.11a.

For a typical wireless LAN system, one of the above specifications is chosen. In some cases, however, both specifications may be enabled and set in a wireless LAN terminal. This wireless LAN terminal scans both the 802.11b/g and 802.11a bands during a scanning process for searching for an access point to be connected.

A technology related to the invention in this application is disclosed in Patent Literature 1. This technology suggests a method of reducing a process for searching of a wireless LAN terminal. In this method, an access point manages a roaming history, and when receiving a connection request from a terminal, notifies this terminal of search candidate information based on the roaming history information. In the technology of Patent Literature 1, however, an access point manages roaming history information and notifies a wireless LAN terminal of this information.

Patent Literature 2 has a description in which when the power is turned on, a terminal detects whether it can connect to an access point APx at frequencies of 2.4 GHz, 5.2 GHz, and 5.3 GHz in this order. If the reception qualities are not good (moderately low), the terminal repeats the same operations for next access points APy and APz.

CITATION LIST

Patent Literature

{PTL 1} JP-A-2003-264565
{PTL 2} JP-A-2008-17340 (abstract and paragraphs 0084, 0100, 0119, 0120, etc.)

SUMMARY OF INVENTION

Technical Problem

The 802.11b/g band has 14 channels; the 802.11a band has 19 channels. Therefore, the terminal needs to scan total 33 channels during the scanning process for searching for an access point to be connected. Consequently, the scanning time is prolonged, which requires a long time to detect an access point to be switched to during the roaming, possibly causing a communication error.

In Patent Literature 1 described above, the access point to be constructed needs to be implemented with any original processes. It is thus difficult to use a general-purpose access point.

An object of the present invention is to provide: a wireless communication terminal that is capable of performing a roaming with a short-time scanning; and a roaming method for a wireless communication terminal which enables the wireless communication terminal to perform roaming with a short-time scanning.

Solution to Problem

According to a wireless communication terminal of the present invention, there is provided a wireless communication terminal including:
a scanning section configured to, in a case where a roaming is performed to switch a connection to an access point in the course of movement, perform a scan for an access point from a high-priority scan-band in descending order; and
a roaming executing section configured to, in a case where a scanning result of the scanning section indicates that an access point of a roaming destination is present, make a connection,
wherein in a case where a scanning result of scanning a scan-band of a priority order indicates that an access point of a roaming destination is not present, the scanning section scans a scan-band of a lower priority order than the priority order.

According to a roaming method of the present invention, there is provided a roaming method for a wireless communication terminal, including:
determining whether to perform a roaming to switch a connection to an access point while a wireless communication terminal is moving;
in a case where it is determined that the roaming is performed, performing a scan for an access point from a high-priority scan-band in descending order; and
in a case where a scanning result indicates that an access point of a roaming destination is present, making a connection.

Advantages Effects of the Invention

According to the present invention, when a process for scanning an access point is performed during a roaming, bands to be scanned are given priority order. Therefore, the present invention can be effective in enhancing scanning efficiency and shortening a scanning time.

Shortening a scanning time can also be sped up the time until roaming completion.

BRIEF DESCRIPTION OF DRAWINGS

FIG. 7 A figure illustrates an information table.

REFERENCE SIGNS LIST

Figure 1:
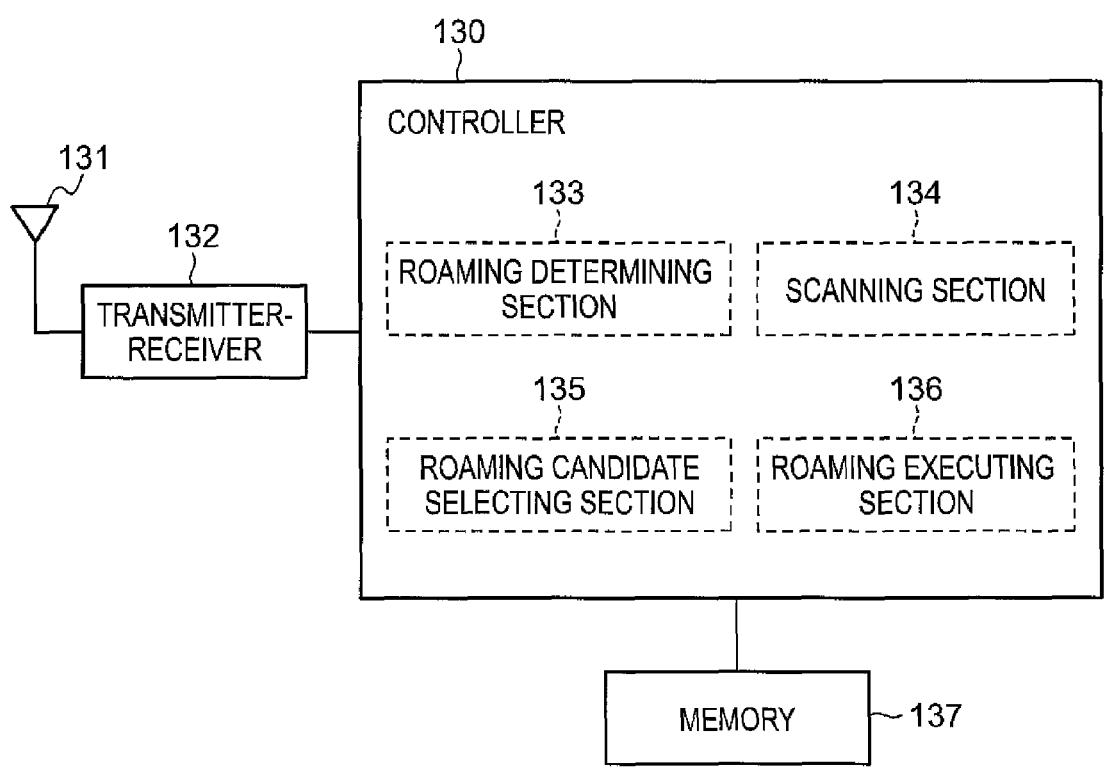
FIG. 1 A figure illustrates a block diagram of a configuration in a first embodiment of a wireless communication terminal in the present invention.

130 controller
131 antenna
132 transmitter-receiver
133 roaming determining section
134 scanning section
135 roaming candidate selecting section
136 roaming executing section
137 memory

DESCRIPTION OF EMBODIMENTS

Some embodiments of the present invention will be described below in detail by using the drawings.

(First Embodiment)

Figure 2:
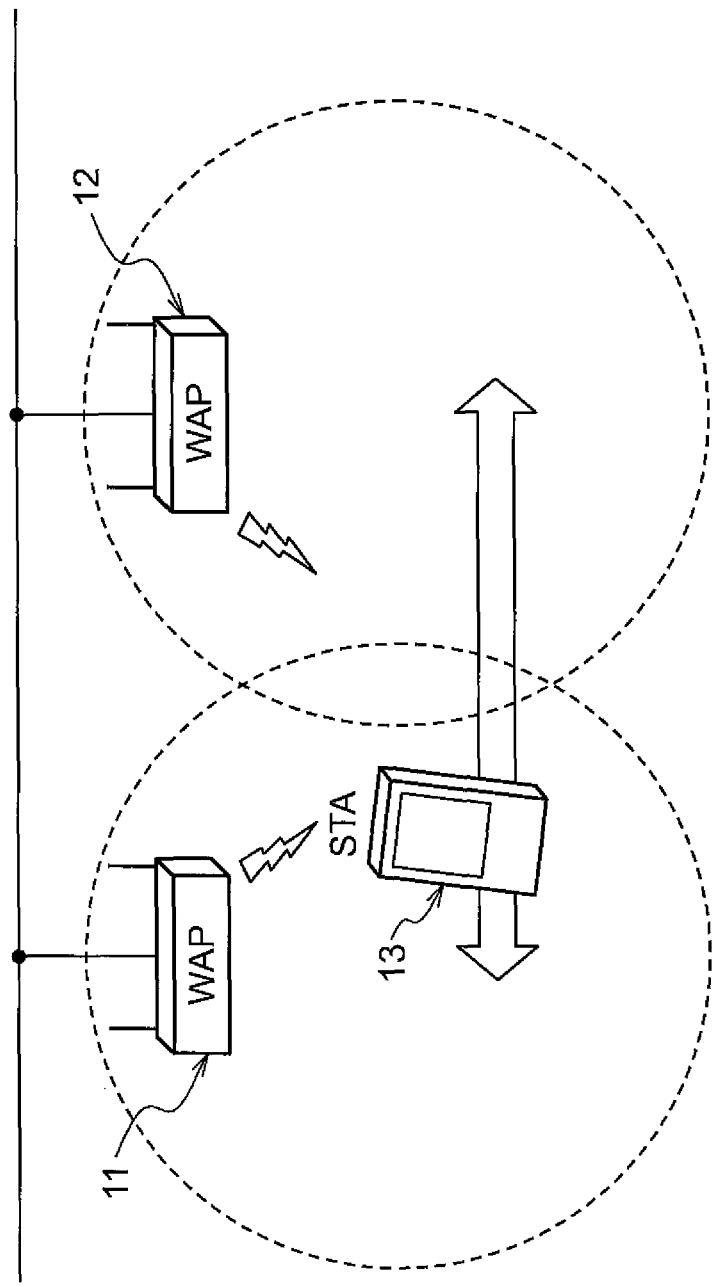
FIG. 2 A figure illustrates a configuration view of an exemplary configuration of a wireless communication system that uses the wireless communication terminal in the first embodiment of the present invention.

FIG. 1 is a block diagram illustrating a configuration of an embodiment of a wireless communication terminal in the present invention. FIG. 2 is a configuration view illustrating an exemplary configuration of a wireless communication system that uses the wireless communication terminal (wireless LAN terminal) in the embodiment of the present invention.

As illustrated in FIG. 2, the wireless communication system that uses the wireless communication terminal in this embodiment includes: an access point (referred to below as a WAP) 11; a WAP 12; and a wireless communication terminal (referred to below as an STA) 13 that connects to the WAP 11 or 12 via a wireless LAN. In FIG. 2, the STA 13 is currently connected to the WAP 11. Here, the two WAPs are illustrated; however, an unlimited number of WAPs, such as three or more WAPs, may be used.

As illustrated in FIG. 1, the wireless communication terminal (STA) in this embodiment includes: an antenna 131; a transmitter-receiver 132 that is connected to the antenna 131 and conducts wireless communication with the WAP 11 or 12; a controller 130 that controls the entire terminal; and a memory 137 connected to the controller 130. The controller 130 includes a roaming determining section 133, a scanning section 134, a roaming candidate selecting section 135, and a roaming executing section 136. The roaming determining section 133 monitors the received signal strength (hereinafter abbreviated as RSSI) of a radio wave from the WAP 11 to which the STA is connected. In addition, while the STA is moving, the roaming determining section 133 determines whether to perform a roaming in which access points are switched. When the roaming determining section 133 determines that the STA will perform the roaming, the scanning section 134 assigns priority order to bands to be scanned and scans access points. The roaming candidate selecting section 135 selects the WAP candidate for a roaming destination, on the basis of the scanning result of the scanning section 134. If a WAP is present, the roaming executing section 136 establishes the connection to the WAP. A central processing unit (CPU) in the controller fulfills the functions of the roaming determining section 133, the scanning section 134, the roaming candidate selecting section 135, and the roaming executing section 136 by reading a program for fulfilling these functions from the memory 137 and executing this program. FIG. 1 illustrates only the constituent elements related to the present invention.

Next, an operation of the wireless communication system described above will be described in detail with reference to FIGS. 1 and 2 and a flowchart in FIG. 3.

Suppose the STA 13 moves from the radio wave area of WAP 11 to that of the WAP 12 while staying connected to the WAP 11. The roaming determining section 133 in the STA 13, which regularly monitors the RSSI of the radio wave from the WAP 11, detects the decrease in the RSSI value which is caused due to the movement. If the RSSI value becomes less than a threshold at which the roaming is determined to be performed, the roaming determining section 133 detects the WAP 12 having a higher RSSI value and performs a roaming to the WAP 12. A roaming process for searching for and connecting to a WAP will be described below in detail.

Figure 3:
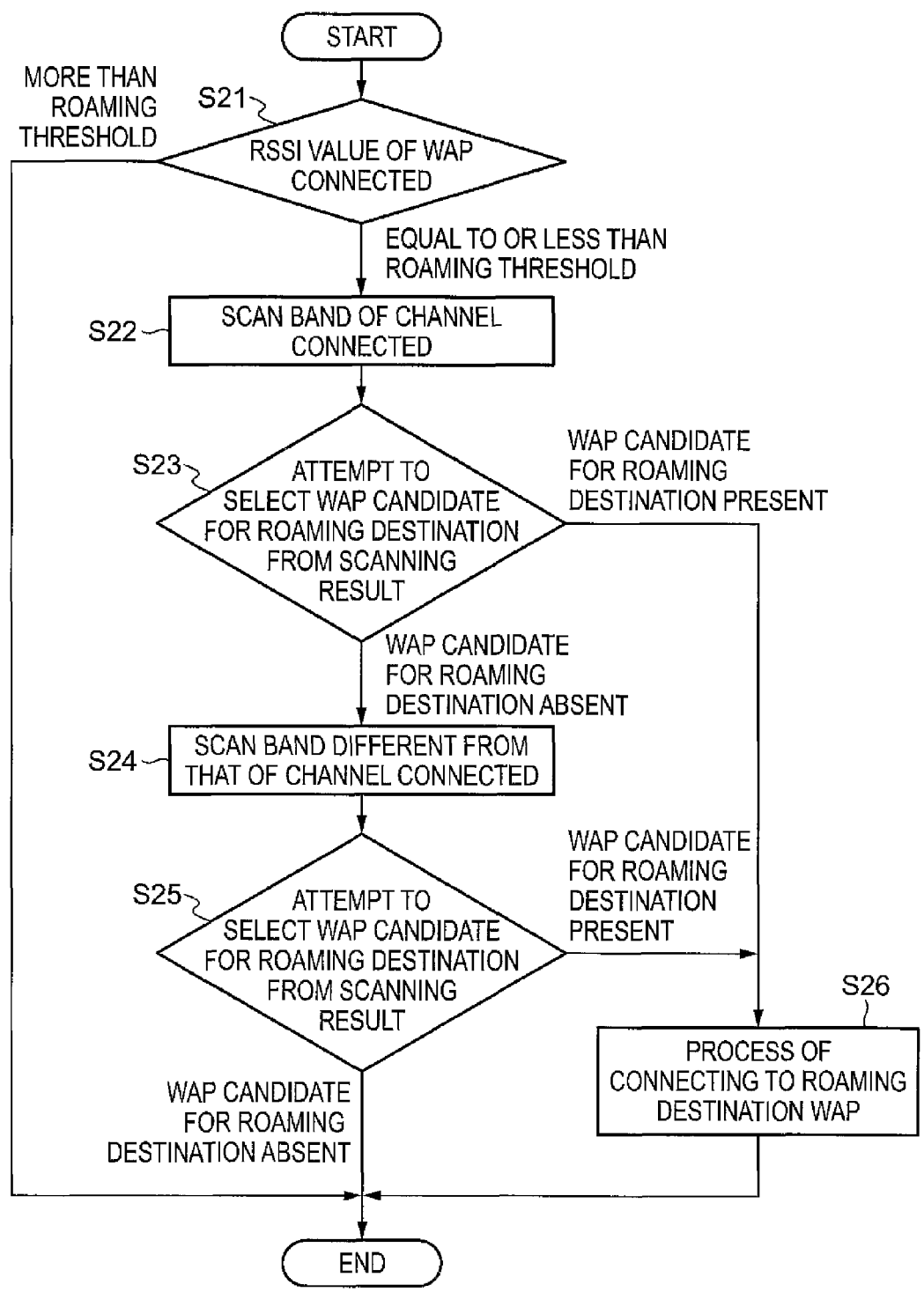
FIG. 3 A figure illustrates a flowchart of an operation of the wireless communication terminal in the above embodiment.

The roaming determining section 133 in the STA 13 confirms whether the RSSI value of the WAP 11 to which the STA 13 is currently connected is equal to or less than a roaming threshold (Step S21 in FIG. 3).

If the RSSI value of the WAP 11 to which the STA 13 is currently connected is equal to or less than the roaming threshold, first, the scanning section 134 scans the band that is the same as the band of the channel of the WAP 11 (Step S22 in FIG. 3). Assuming that the channel of WAP 11 is 1, the 802.11b/g band is scanned; assuming that the channel of WAP 11 is 36, the 802.11a band is scanned.

Then, the roaming candidate selecting section 135 attempts to select the WAP candidate for a roaming destination which has a higher RSSI value than the WAP 11 to which the STA 13 is currently connected, on the basis of the information regarding WAPs obtained from the scanning result (Step S23 in FIG. 3).

If the WAP candidate, or the roaming destination, is found, the roaming executing section 136 performs a roaming by performing a process for connecting to the roaming destination WAP (Step S26 in FIG. 3). In this way, the STA can perform a roaming by scanning only the band that is the same as the band of the channel of the WAP to which the STA 13 is connected, thereby allowing for a short-time connection. In general, WAPs disposed over the same network are quite likely to have identical band setting. Therefore, the connection to WAPs using different frequency bands may be given lower priority.

If no WAP is found in selecting the WAP candidate (Step S23 in FIG. 3), the scanning section 134 scans bands different from the band of the channel of the WAP to which the STA 13 is connected (Step S24 in FIG. 3).

The roaming candidate selecting section 135 attempts to select the WAP candidate for the roaming destination, on the basis of the information regarding WAPs obtained from the scanning result (Step S25 in FIG. 3). If the WAP candidate for the roaming destination is found, the roaming executing section 136 performs a roaming (Step S26 in FIG. 3). This processing is equivalent to processing through which all the bands are scanned and then a roaming is performed. As a result, the period over which the roaming is performed is the same as the period over which a normal scanning process is performed.

If the WAP candidate for the roaming destination is not found, the processing is terminated.

(Second Embodiment)

In the first embodiment described above, at first, the scanning section 134 scans the band of the channel currently connected, during the roaming. In the second embodiment, however, the scanning section 134 scans bands within the band of the channel currently connected, in accordance with priority order, as shown in a flowchart of FIG. 4. A wireless communication terminal (wireless LAN terminal) and a wireless communication system in this embodiment have the same configurations as those in FIGS. 1 and 2.

The band of the wireless LAN can be separated into 802.11b/g and 802.11a, and 802.11a can be further separated into a W52 band (5.15 to 5.25 GHz), a W53 band (5.25 to 5.35 GHz), and a W56 band (5.457 to 5.725 GHz). Some of these bands may affect communication, depending on their surrounding environment or usage.

For example the 802.11b/g band is a frequency band called an ISM band and used by various types of apparatuses. For this reason, those apparatuses are subject to suffering from radio wave interferences with each other. In addition, 802.11b/g was specified before 802.11a and thus has been used by many wireless terminals. So, radio wave interferences are quite likely to occur in this band. On the other hand, 802.11a tends to propagate more straightly than 802.11b/g and is more sensitive to an obstacle accordingly. Radio waves within the W53 and W56 bands may be halted from being emitted when interfering with a weather radar.

A description will be given below of an operation of the wireless communication terminal in this embodiment by using FIG. 4.

Figure 4:
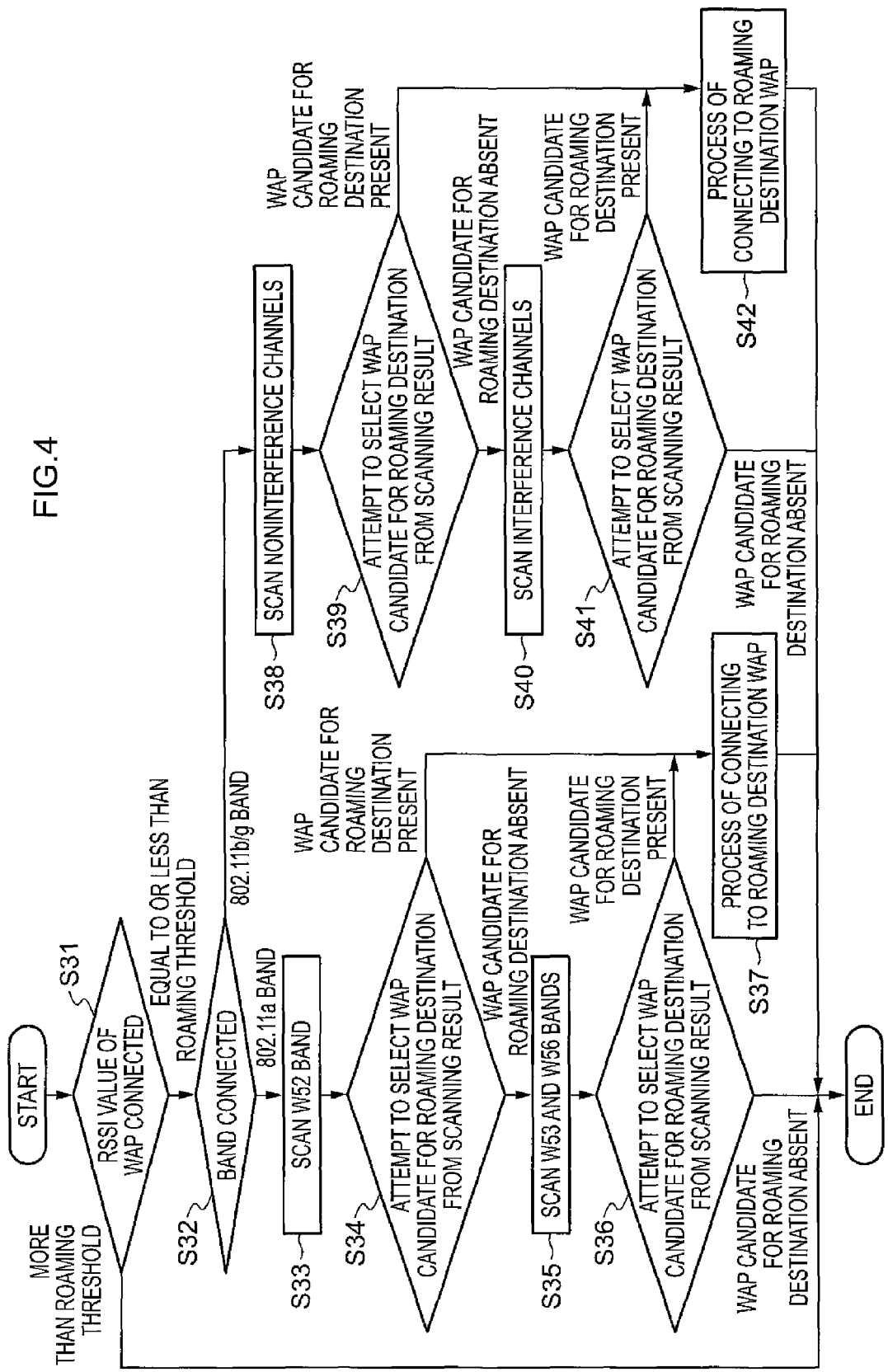
FIG. 4 A figure illustrates a flowchart of an operation of a wireless communication terminal in a second embodiment of a wireless communication terminal in the present invention.

A roaming determining section 133 in an STA 13 confirms whether the RSSI value of a WAP 11 to which the STA 13 is currently connected is equal to or less than a roaming threshold (Step S31 in FIG. 4).

If the RSSI value of the WAP 11 to which the STA 13 is connected is equal to or less than the roaming threshold, the scanning section 134 identifies whether the band of the channel currently connected is 802.11a or 802.11b/g (Step S32 in FIG. 4). If the band of the channel currently connected is 802.11a, a scanning section 134 first scans the channel within the W52 band (Step S33 in FIG. 4). A reason is that a channel within the W52 band is more likely to be set in a WAP than channels within the W53 and W56 bands, because radio waves within the W53 and W56 bands may be halted from being emitted when detecting a weather radar. A roaming candidate selecting section 135 attempts to select the WAP candidate for a roaming destination on the basis of the scanning result (Step S34 in FIG. 4). If no WAP candidate is found within the W52 band, the scanning section 134 scans channels within the W53 and W56 bands (Step S35 in FIG. 4). If the WAP candidate is found within the W52 band, a roaming executing section 136 performs a roaming (Step S37 in FIG. 4).

The roaming candidate selecting section 135 attempts to select the WAP candidate for a roaming destination on the basis of the information regarding WAPs obtained from the scanning result (Step S36 in FIG. 4). If the WAP candidate for the roaming destination is found, the roaming executing section 136 performs a roaming (Step S37 in FIG. 4). If the WAP candidate for the roaming destination is not found, the processing is terminated.

If the band of the channel currently connected is 802.11b/g, it is highly likely that channels are set to WAPs every four channels in order to avoid any interference or channels are set to WAPs every five channels in order to avoid any interference and frequency overlapping; the channels set every four channels are referred to as noninterference channels (1), and the channels set every five channels are referred to as noninterference channels (2). The scanning section 134 first scans such noninterference channels (Step S38 in FIG. 4). If 1ch is currently connected, for example, the scanning section 134 may scan channels every four channels, such as scans 5ch, 9ch, and 13ch. Alternatively, if 1ch is currently connected, for example, the scanning section 134 may scan channels every five channels, such as scans 6ch and 11ch.

The noninterference channels (1) and (2) can be determined from the following equations. The noninterference channels may be only the noninterference channels (1), only the noninterference channels (2), or a combination of the noninterference channels (1) and (2).

Noninterference channels (1)=n+/−4*x,
where n denotes a channel currently connected, x denotes an integer of 1 or more. The noninterference channels (1) are integers of 1 to 13.

Noninterference channels (2)=n+/−5*x,
where n denotes a channel currently connected, x denotes an integer of 1 or more. The noninterference channels (2) are integers of 1 to 13.

The roaming candidate selecting section 135 attempts to select the WAP candidate for a roaming destination on the basis of the scanning result (Step S39 in FIG. 4). If no WAP candidate is found, the scanning section 134 scans interference channels (all channels excluding noninterference channels) (Step S40 in FIG. 4). If the WAP candidate is found, the roaming executing section 136 performs a roaming (Step S42 in FIG. 4).

The roaming candidate selecting section 135 attempts to select the WAP candidate for a roaming destination on the basis of the information regarding WAPs obtained from the scanning result (Step S41 in FIG. 4). If the WAP candidate for the roaming destination is found, the roaming executing section 136 performs a roaming (Step S42 in FIG. 4). If the WAP candidate for the roaming destination is not found, the processing is terminated.

(Third Embodiment)

Next, a description will be given of a third embodiment of the wireless communication terminal in the present invention, with reference to a block diagram of a wireless communication terminal (wireless LAN terminal) in FIG. 5, a flowchart in FIG. 6, and an information table in FIG. 7. The wireless communication system has the same configuration as that in FIG. 2.

In the second embodiment described above, the scanning section 134 scans bands within the band of the channel currently connected, in accordance with priority order, as shown in FIG. 4. In the third embodiment, in order to avoid affecting communication like the second embodiment, bands are given priority as by patterns listed in FIG. 7. Further, any band that is less likely to affect communication is selected preferentially.

Figure 5:
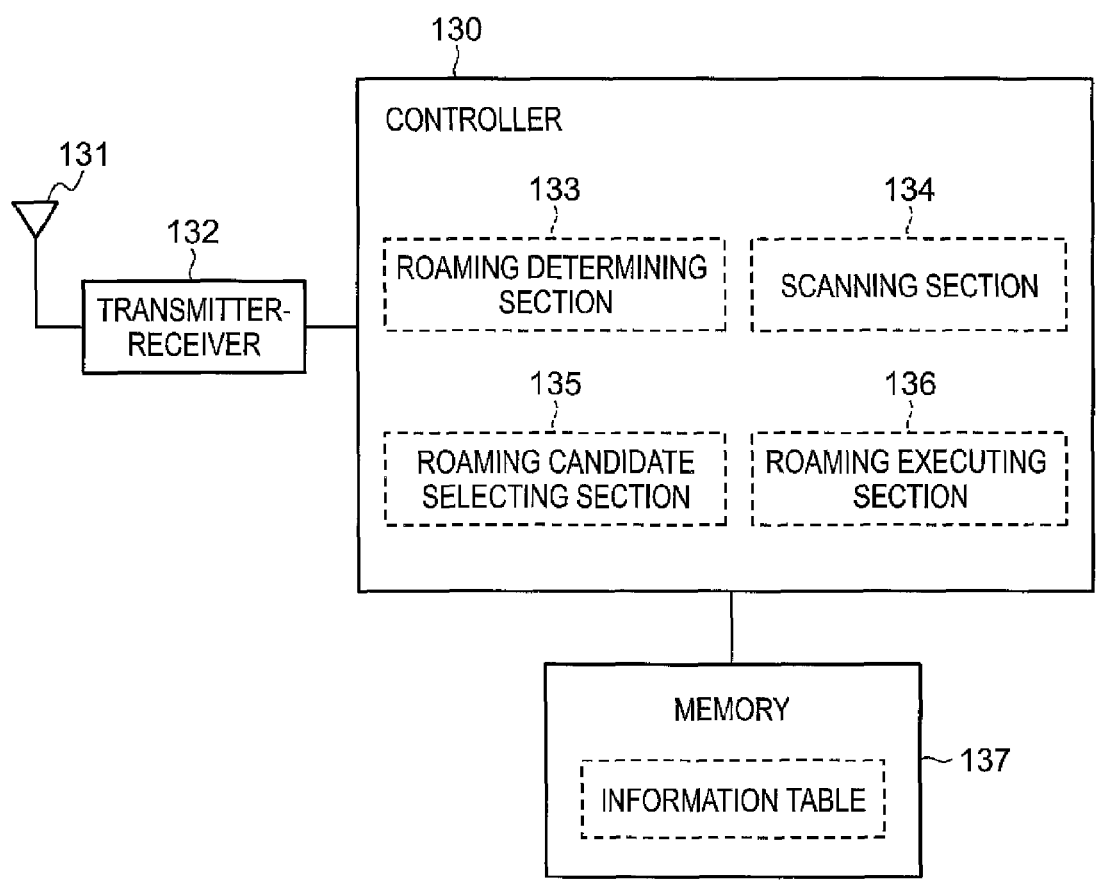
FIG. 5 A figure illustrates a block diagram of a configuration of a wireless communication terminal in a third embodiment of the wireless communication terminal in the present invention.

As compared to the configuration illustrated in FIG. 1, the wireless communication terminal in this embodiment illustrated in FIG. 5 differs in storing the information table of FIG. 7 in a memory 137.

A detailed description will be given below of an operation in the third embodiment of the present invention, with reference to the flowchart of FIG. 6 using the patterns in the information table of FIG. 7.

Suppose the memory 137 in an STA 13 retains information regarding the patterns illustrated in FIG. 7 and a scanning section 134 selects one of the patterns. When performing a scanning process during a connection process, the scanning section 134 in the STA 13 scans a first priority band registered in the pattern (Step S41 in FIG. 6). A roaming candidate selecting section 135 attempts to select the WAP candidate for a connection destination, on the basis of information regarding WAPs obtained from the scanning result (Step S42 in FIG. 6).

Figure 6:
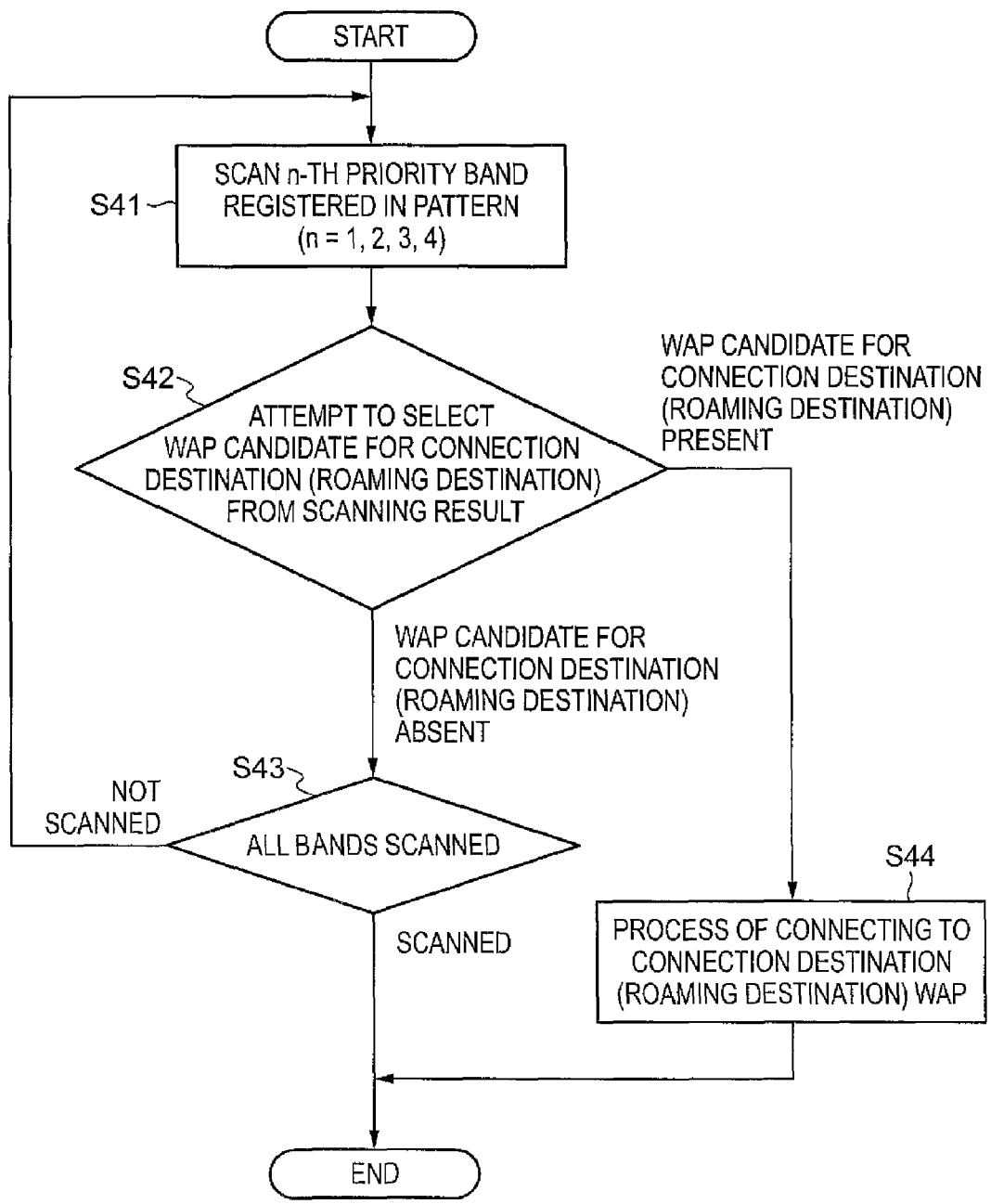
FIG. 6 A figure illustrates a flowchart of an operation of the wireless communication terminal in the third embodiment of the wireless communication terminal in the present invention.

If the WAP candidate for the connection destination is found, a roaming executing section 136 performs a connection process (Step S44 in FIG. 6). In this way, the STA 13 scans only priority bands and establishes a connection, thereby allowing for a short-time connection and a priority scanning.

If no WAPs are found in selecting the WAP candidate (Step S42 in FIG. 6), the roaming candidate selecting section 135 checks whether all the bands have been scanned (Step S43 in FIG. 6). If the scanning has been completed, the processing is concluded. If the scanning has not yet been completed, the scanning section 134 reads information regarding a second priority band from the memory 137 and scans the second priority band (Step S41 in FIG. 6). The scanning section 134 and the roaming candidate selecting section 135 repeat Steps S41 to S43 until all the bands have been completely scanned.

In the above way, the STA 13 scans all the bands in order from the first priority band, performing the connection process. In short, the STA 13 establishes a connection to a priority band, making it possible to select a connection in accordance with application and make a connection to a higher-quality environment.

The wireless communication terminal in each embodiment described above provides a roaming function in which when a radio wave emitted from an access point connected to the wireless communication terminal is weakened due to the movement of the wireless communication terminal, a WAP emitting a stronger radio wave is detected through scanning and the connection is switched to the detected WAP. The wireless communication terminal in each embodiment performs a scanning process for an access point during a roaming. Further, the wireless communication terminal gives priority order to bands to be scanned, thereby performing the scanning process efficiently and shortening the scanning time. Shortening the scanning time in this manner can also shorten the period over which the roaming has been performed.

This application is based upon Japanese Patent Application No. 2013-112805 filed on May 29, 2013 and claims the priority from Japanese Patent Application No. 2013-112805 under the Paris Convention. The contents disclosed in Japanese Patent Application No. 2013-112805 are incorporated herein by reference.

Detailed representative embodiments of the present invention have been described. It should be understood that various changes, substitutions, and alternatives are possible without departing from the spirit and scope of the invention specified in the claims. The inventor intends that the scopes of equivalents for the inventions in the claims should be maintained, provided that the claims are amended through application procedures.

Part or all of the embodiments described above can be described as in Supplementary note described below; however, the embodiments are not limited to the configurations described below.

(Supplementary Note 1)

A wireless communication terminal comprising:
a scanning section configured to, in a case where a roaming is performed to switch a connection to an access point in the course of movement, perform a scan for an access point from a high-priority scan-band in descending order; and a roaming executing section configured to, in a case where a scanning result of the scanning section indicates that an access point of a roaming destination is present, make a connection, wherein in a case where a scanning result of scanning a scan-band of a priority order indicates that an access point of a roaming destination is not present, the scanning section scans a scan-band of a lower priority order than the priority order.

(Supplementary Note 2)

The wireless communication terminal according to claim 1, wherein in a case where the scanning section scans a band of a channel currently connected and a scanning result indicates that an access point of a roaming destination is not present, the scanning section scans a band different from the band of the channel currently connected.

(Supplementary Note 3)

The wireless communication terminal according to claim 2, wherein in a case where the band of the channel currently connected is 802.11a, the scanning section scans a channel within a W52 band in preference to channels within W53 and W56 bands.

(Supplementary Note 4)

The wireless communication terminal according to claim 2, wherein in a case where the band of the channel currently connected is 802.11b/g, the scanning section scans a non-interference channel in preference to an interference channel.

(Supplementary Note 5)

The wireless communication terminal according to claim 1, further comprising a memory configured to store an information table in which priority order is defined, the priority order defining which band is preceded when bands of a plurality of channels are scanned, wherein the scanning section scans a band of the highest priority order.

(Supplementary Note 6)

A roaming method for a wireless communication terminal, comprising:

determining whether to perform a roaming to switch a connection to an access point while a wireless communication terminal is moving;

in a case where it is determined that the roaming is performed, performing a scan for an access point from a high-priority scan-band in descending order; and in a case where a scanning result indicates that an access point of a roaming destination is present, making a connection.

(Supplementary Note 7)

The roaming method according to claim 6, wherein in a case where a band of a channel currently connected is scanned and a scanning result indicates that an access point of a roaming destination is not present, a band different from the band of the channel currently connected is scanned.

(Supplementary Note 8)

The roaming method according to claim 7, wherein in a case where the band of the channel currently connected is 802.11a, a channel within a W52 band is scanned in preference to channels within W53 and W56 bands.

(Supplementary Note 9)

The roaming method according to claim 7, wherein in a case where the band of the channel currently connected is 802.11b/g, a noninterference channel is scanned in preference to an interference channel.

(Supplementary Note 10)

The roaming method according to claim 6, further comprising storing information in an information table, the information defining priority order that defines which band is preceded when bands of a plurality of channels are scanned, wherein a band of the highest priority order is scanned.

(Supplementary Note 11)

A wireless communication system comprising:

a wireless communication terminal according to any one of claims 1 to 5; and an access point configured to conduct wireless communication with the wireless communication terminal.

(Supplementary Note 12)

A roaming program causing a computer as a wireless communication terminal to perform processes for:

determining whether to perform a roaming to switch a connection to an access point while a wireless communication terminal is moving;

in a case where it is determined that the roaming is performed, performing a scan for an access point from a high-priority scan-band in descending order; and in a case where a scanning result indicates that an access point of a roaming destination is present, making a connection.

(Supplementary Note 13)

The roaming program according to claim 12, wherein in a case where in the scanning process, a band of a channel currently connected is scanned and a scanning result indicates that an access point of a roaming destination is not present, a band different from the band of the channel currently connected is scanned.

(Supplementary Note 14)

The roaming program according to claim 12, wherein in a case where in the scanning process, the band of the channel currently connected is 802.11a, a channel within a W52 band is scanned in preference to channels within W53 and W56 bands.

(Supplementary Note 15)

The roaming program according to claim 12, wherein in a case where the band of the channel currently connected is 802.11b/g, a noninterference channel is scanned in preference to an interference channel.

(Supplementary Note 16)

The roaming program according to claim 12, further comprising storing information in an information table about bands of a plurality of channels, the information defining priority order that defines which band is preceded when bands of a plurality of channels are scanned, wherein a band of the highest priority order is scanned.

INDUSTRIAL APPLICABILITY

The present invention is applicable to wireless communication terminals that sequentially scan a plurality of scan-bands and roaming methods for such wireless communication terminals. More specifically, the present invention is applicable to wireless LAN terminals and roaming methods for such wireless LAN terminals.

What is claimed is:

1. A wireless communication terminal comprising:
   a processor coupled with a memory, the processor configured to execute:
   a roaming determining section configured to determining whether to perform a roaming in which access points are switched in the course of movement of the wireless communication terminal;
   a scanning section configured to, in a case where the roaming is performed to switch a connection to an access point in the course of movement of the wireless communication terminal, perform a scan for the access point from a high-priority scan-band in descending order;
   a roaming candidate selecting section configured to select an access point candidate for a roaming destination on the basis of information regarding the access points obtained from a scanning result of the scanning section; and
   a roaming executing section configured to, in a case where the access point for the roaming destination is found, perform a process of connecting to the access point of the roaming destination,
   wherein in a case where the scanning result of scanning a scan-band of a priority order indicates that the access point of the roaming destination is not found, the scanning section scans a scan-band of a lower priority order than the priority order,
   in a case where the roaming is performed, the scanning section scans, as the high-priority scan-band, a band that is the same as a band of a channel of an access point currently connected, and in a case where a result of the scanning indicates that the access point of the roaming destination is not found, the scanning section scans a band different from the band of the channel of the access point currently connected, and
   the bands scanned by the scanning section are an 802.11a band and an 802.11b/g band.

2. The wireless communication terminal according to claim 1, wherein
   in a case where the band of the channel of the access point currently connected is 802.11a, the scanning section scans a channel within a W52 band in preference to channels within W53 and W56 bands.

3. The wireless communication terminal according to claim 1, wherein
   in a case where the band of the channel of the access point currently connected is 802.11b/g, the scanning section scans a noninterference channel in preference to an interference channel.

4. A roaming method for a wireless communication terminal, comprising:
   determining whether to perform a roaming to switch a connection to an access point while the wireless communication terminal is moving;
   in a case where it is determined that the roaming is performed, performing a scan for an access point from a high-priority scan-band in descending order;
   selecting an access point candidate for a roaming destination on the basis of information regarding access points obtained from a scanning result;
   in a case where the access point candidate for the roaming destination is found, performing a process of connecting to the access point of the roaming destination;
   in a case where the roaming is performed, scanning, as the high-priority scan-band, a band that is the same as a band of a channel of an access point currently connected, and in a case where a result of the scanning indicates that the access point of the roaming destination is not found, scanning a band different from the band of the channel of the access point currently connected; and the scanned bands are an 802.11a band and an 802.11b/g band.

5. The roaming method for a wireless communication terminal according to claim 4, wherein in a case where the band of the channel currently connected is 802.11a, a channel within a W52 band is scanned in preference to channels within W53 and W56 bands.

6. The roaming method for a wireless communication terminal according to claim 4, wherein in a case where the band of the channel of the access point currently connected is 802.11b/g, a noninterference channel is scanned in preference to an interference channel.

* * * * *